United States Patent [19]
Limcaco

[11] Patent Number: 6,158,386
[45] Date of Patent: Dec. 12, 2000

[54] FLUID TREATMENT SYSTEMS

[75] Inventor: Christopher A. Limcaco, Moorseville, Ind.

[73] Assignee: Aquatic Engineers, Inc., Camby, Ind.

[21] Appl. No.: 09/377,042

[22] Filed: Aug. 18, 1999

[51] Int. Cl.[7] .............................................. A01K 63/00
[52] U.S. Cl. ........................ 119/245; 119/264; 119/248
[58] Field of Search .................................... 119/245, 246, 119/248, 250, 251, 255, 256, 264, 260, 261, 266; 210/416.2, 169

[56] References Cited

U.S. PATENT DOCUMENTS

| | | | |
|---|---|---|---|
| 3,632,315 | 1/1972 | Uitti et al. ............................... | 422/256 |
| 3,719,278 | 3/1973 | Kolfertz ................................... | 210/169 |
| 4,606,821 | 8/1986 | D'Imperio . | |
| 4,608,181 | 8/1986 | Hsiung et al. ........................... | 210/786 |
| 4,836,142 | 6/1989 | Dunback . | |
| 5,005,521 | 4/1991 | Strong . | |
| 5,006,230 | 4/1991 | Votava, III et al. ..................... | 210/94 |
| 5,108,609 | 4/1992 | Burt . | |
| 5,160,622 | 11/1992 | Gunderson et al. . | |
| 5,248,415 | 9/1993 | Masuda et al. .......................... | 210/154 |
| 5,467,739 | 11/1995 | Boschert . | |
| 5,494,581 | 2/1996 | Hobson . | |
| 5,535,702 | 7/1996 | Idbeis . | |
| 5,571,409 | 11/1996 | Scarborough . | |
| 5,647,983 | 7/1997 | Limcaco . | |
| 5,680,989 | 10/1997 | Plachy et al. . | |
| 5,732,657 | 3/1998 | Idbeis . | |
| 5,738,137 | 4/1998 | Reinke . | |
| 5,755,961 | 5/1998 | Limcaco . | |
| 5,779,885 | 7/1998 | Hickok et al. .......................... | 210/150 |
| 5,782,204 | 7/1998 | Rahn . | |
| 6,054,045 | 4/2000 | Wittstock et al. ....................... | 210/169 |

FOREIGN PATENT DOCUMENTS

2920131 A1  11/1980  Germany .
1484727    11/1977  United Kingdom .

OTHER PUBLICATIONS

Walter H. Adey and Karen Loveland, "Dynamic Aquaria," Building Living Ecosystems, Academic Press, Inc. (San Diego, California 92101), pp. 84–93, (Nov. 15, 1991).

J. Charles Delbeek and Julian Sprung, "The Reef Aquarium," A Comprehensive Guide to the Identification and Care of Tropical Marine Invertebrates, Ricordea Publishing (Coconut Grove, FL 33133), pp. 164–171, (Nov. 19, 1966).

Primary Examiner—Peter M. Poon
Assistant Examiner—Yvonne R. Abbott
Attorney, Agent, or Firm—Baker & Daniels

[57] ABSTRACT

A fluid surge assembly for treating aquarium water and other fluids includes a treatment unit for receiving fluid, treating the fluid and depositing the fluid along a flow path to a body of fluid and a weir assembly disposed in the flow path between the treatment unit and the body of fluid. The weir assembly includes a lower weir blocking a portion of the flow path and an upper weir. The lower edge of the upper weir is offset from the crest of the lower weir to define a first fountain path. The crest of the upper weir defines a portion of a second fountain path. The second fountain path intersects the first fountain path to increase the velocity and distance traveled of the fluid. The invention also includes aquarium systems employing the fluid surge assembly. In some embodiments, the aquarium systems provide an opaque decorative member to block the treatment unit from view. In some embodiments, the decorative member is live rock. In preferred embodiments, a top portion of the decorative member is disposed below the first and second fountain paths to create the image that waves are crashing over rocks. In a particular embodiment, the aquarium tanks are constructed to surround the treatment unit and hide it from view from all sides of the tank.

20 Claims, 14 Drawing Sheets

FLUID TREATMENT SYSTEMS

FIELD OF THE INVENTION

The present invention relates to fluid treatment devices and systems. Specifically, this invention concerns aquarium and other fluid treatment systems that model natural, healthy ecosystems.

BACKGROUND OF THE INVENTION

Aquarium enthusiasts have searched for the perfect water treatment system that will model a natural ecosystem. Water movement, oxygen and pH control, nutrient control and waste removal are essential for a healthy, captive water ecosystem. The system must support algae, aerobic bacteria, plankton and coral growth to satisfy these requirements. Moreover, this ideal system would be attractive and relatively maintenance-free.

Water movement is critical to the ideal system because it facilitates the exchange of metabolites. Algae, which is required for a healthy captive ecosystem, requires water movement. In nature, the ocean tides rise and fall over algae covered rocks. Several approaches have been used to attempt to mimic natural water movement. Lee Chin Eng circulated unfiltered sea water with air bubbles in his "nature's system" to model the wave action of nature ecosystems. Wave generators have been used to create water movement but unfortunately these devices can cause a degree of splashing that upsets the salt concentration of the water. Several references disclose systems that rely partially on equilibrium or gravity for water movement. Most contemplate the use of a water pump that is disadvantageous due to plankton mortality. Plankton is required to support coral and filter feeding organisms. (See U.S. Pat. No. 5,419,831 to Fuerst et al.; U.S. Pat. No. 4,867,874 to Aubert et al.; U.S. Pat. No. 4,606,821 to D'Imperio; U.S. Pat. No. 5,096,576 to Szabo and U.S. Pat. No. 4,761,227 to Willinger et al.) Some references use an air pump to induce water flow and introduce oxygen. (See U.S. Pat. No. 5,234,581 to Rosenberg and U.S. Pat. No. 5,269,914 to Englert). Unfortunately, many of these devices also cause splashing.

In addition to the problems caused by excessive splashing using known fluid movement devices, these devices force fluid continuously to the same location in the aquarium or body of fluid. This results in dead spots in the aquarium that are not exposed to the beneficial water movement. To avoid this problem, current systems require that the direction of the nozzle or water outlet be manually changed.

Although there have been many attempts to achieve an acquarium system that provides natural water movement, none of the known devices simulate ocean currents in an aquarium.

Various methods and devices have been developed to control oxygen concentration, pH, nutrient availability and waste removal. To date, the most natural approaches have used biological filters or algae turf scrubbers. Biological filtration systems provide attachments surfaces for microorganisms to increase biological and chemical activities.

Trickle filters are also available for biological filtration. In such devices, water is typically removed from the aquarium and allowed to trickle over a bed of lava rock or plastic balls. Trickle filters provide an oxygen rich environment for the growth of aerobic bacteria because the bed is not submerged. However, trickle filters can take up a relatively large area and usually require dedicated plumbing and pump fixtures. As a result, such filters can be expensive and impractical in most applications. Moreover, they are not particularly useful for the average home aquarium.

Rotating biological filters are often used to support bacterial growth in home aquariums and other fluid treatment applications. These filter systems are partially submerged so that each portion of the media is alternately submerged and exposed to air. See U.S. Pat. No. 5,419,831 to Fuerst which discloses that the filter is rotated with a stream of water. One disadvantage of this device is that it requires a water pump, which is incompatible with plankton life. Bacterial filters are further limited because while they remove ammonia and particulate waste, they deplete oxygen and increase the concentration of nitrates and carbon dioxide.

Algae turf scrubbers address some of the limitations of biological filters in that they control oxygen concentration, pH and nutrient availability. Dr. Adey's system includes a shallow trough in fluid communication with an aquarium tank. A mesh screen in the trough supports algae growth and a wave surge bucket provides water movement. Because algae is most efficient for fluid treatment when young, the algae must be harvested or scraped from the screen periodically. Harvesting simulates the grazing that occurs in natural systems. One disadvantage of this system, however, is that harvesting must be done manually which is labor intensive. Also, the centrifugal pumps required for these systems kill plankton and the splashing disrupts the salt concentrate of the water. Furthermore, these systems require significant modifications to existing aquariums.

A need has remained for devices which connect easily to existing aquariums and other fluid treatment systems to support natural-type ecosystems by controlling pH, oxygen, carbon dioxide concentration, nutrient availability, water movement and waste removal without the disadvantages of harmful splashing, killing plankton and extensive maintenance. For aquarium systems, a need has also remained for devices that achieve these goals without marring the beauty of the aquarium. An ideal system would increase the beauty of the aquarium.

SUMMARY OF THE INVENTION

Devices and systems for treating aquarium water and other fluids are provided. In one aspect, the invention provides a fluid surge assembly that includes a treatment unit for receiving fluid, treating the fluid and depositing the fluid along a flow path to a body of fluid and a weir assembly disposed in the flow path between the treatment unit and the body of fluid. The weir assembly includes a lower weir blocking a portion of the flow path and an upper weir. The lower edge of the upper weir is offset from the crest of the lower weir to define a first fountain path. The crest of the upper weir defines a portion of a second fountain path. The second fountain path intersects the first fountain path to increase the velocity and distance traveled of the fluid.

In another aspect, the invention includes an aquarium system having: a fluid inlet, an aquarium in fluid communication with the inlet to receive fluid displaced from the inlet, a fluid outlet in fluid communication with the tank for receiving water displaced from the tank, a fluid treatment in fluid communication with the inlet and outlet and a weir assembly disposed between the inlet and the tank. The weir assembly includes a pair of offset weirs.

In one embodiment, the treatment unit includes a pump that is operable to displace fluid between the treatment unit and the tank. Preferably, the pump includes a fluid surge device that periodically displaces fluid from a higher level to a lower level in the treatment unit through the inlet and across the weir assembly to raise the level of fluid in the aquarium tank and then returns fluid from the aquarium tank through the outlet to the higher level of fluid in the tank to complete a single surge cycle. One embodiment of a surge device includes a wheel rotatably supported in the treatment tank. The wheel is divided into two continuous portions, each extending from the axis to the perimeter of the wheel. The first portion is hollow to receive fluid when the first portion is rotated into fluid. The second portion contains a fluid displacement media for displacing fluid in the treatment unit when the second portion is rotated into fluid. In a particular embodiment, air capture members are disposed on the perimeter of the wheel for rotating the wheel by capturing air from an air pump.

In preferred embodiments, the lower weir has a height so that fluid continuously flows over the lower crest during the entire surge cycle. The upper weir has a height and position so that fluid flows over the upper crest as fluid is displaced from the treatment unit.

The invention also provides aquarium systems that provide a natural sound and appearance. The aquarium tanks of those systems include a transparent viewing wall and an opposite back wall adjacent the treatment unit. An opaque decorative member is disposed within the tank between the viewing wall and the back wall. In a particular embodiment, the decorative member has the appearance of rocks and is configured and disposed adjacent the back wall to block the back wall and the treatment unit from view through the viewing wall. In some embodiments, the decorative member is live rock. In preferred embodiments, a top portion of the decorative member is disposed below the first and second fountain path to create the image that waves are crashing over rocks.

In another aspect, the aquariums include a side portion in fluid communication with the front portion. The side portions also have a transparent side viewing wall and an opposite outlet wall. The outlet wall is adjacent an outlet reservoir. In some embodiments an opaque decorative member is disposed within the tank to block the outlet wall and the treatment unit from view through the side viewing wall. In another specific embodiment, the aquarium includes a second side portion so that the aquarium tank has a substantially U-shaped configuration defining a chamber for the treatment unit.

Accordingly, it is one object of the invention to provide fluid treatment systems that mimic a natural ecosystem in function, appearance and sound. These and other objects, advantages and features are accomplished according to the devices and systems of the present invention.

DESCRIPTION OF THE PREFERRED EMBODIMENTS

Figure 1:
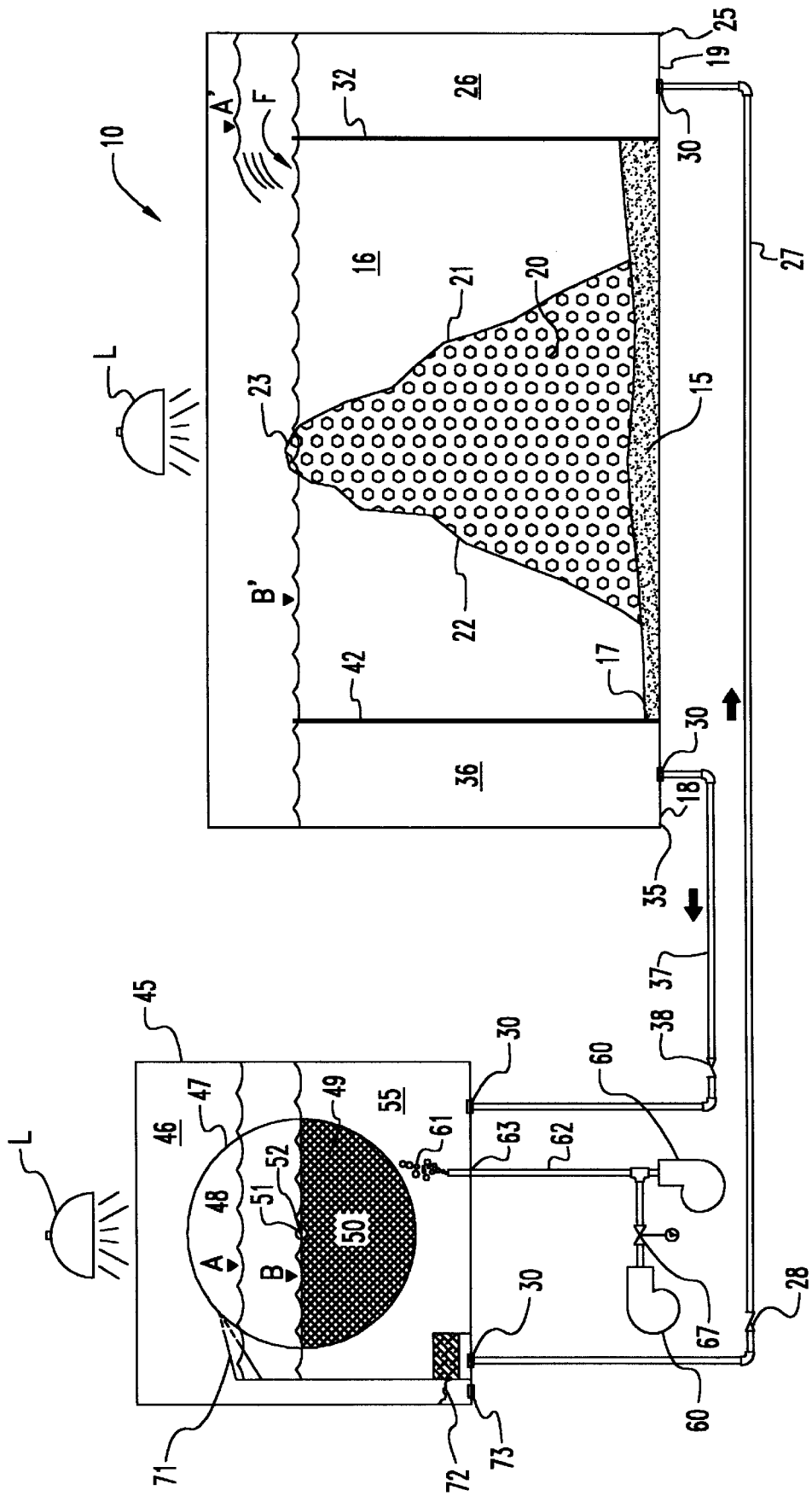
FIG. 1 is a side elevational view of an aquarium system according to one embodiment of this invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention provides devices and systems that support natural-type ecosystems by water movement, controlling pH, oxygen, carbon dioxide concentration, nutrient availability and waste removal. This invention combines algae treatment, biological filtration, water movement, wave creation, current generation and oxygenation in one unit without the requirement for a water pump. The treatment devices of this invention attach easily to existing aquariums without significant modifications.

Generally, the fluid treatment devices and systems of this invention include a rotatably supported media wheel that has a first hollow portion and a second portion carrying a displacement media. The displacement media is alternately submerged into and raised out of fluid contained in a fluid treatment unit as the media wheel is rotated to displace fluid from the unit. When the displacement media is forced into the fluid, the fluid level will rise due to the fluid displaced by the volume of the displacement media. This causes fluid to flow from the treatment unit to the aquarium tank. The fluid levels in both tanks will then equilibrate at a higher level. When the displacement media is moved out of the fluid, the fluid level in the treatment unit will drop and the higher fluid level in the aquarium will cause fluid to flow back to the treatment unit. The continued displacement of fluid by submersing and raising the displacement media causes a surge movement of fluid through the system.

This invention also provides a weir system that causes a natural wave action without harmful splashing. The weir system is configured to cause a two-tiered fountain that forces water flow across the entire cross-sectional area of the aquarium tank, which eliminates dead spots in the aquarium or other fluid body. The wier system forces water through two (2) ninety degree (90°) trajectories during the course of each wave surge cycle. The water motion created by the weir system creates a "current" through the tank. The fountain aspect also aerates the water as it enters the aquarium. In addition, the water movement of the weir system provides an attractive view and a soothing ocean sound.

All of the benefits of this invention can be achieved without unsightly tubing and mechanical components distracting the viewer from the beauty of the aquarium system and its inhabitants.

In accordance with one embodiment of the invention, an aquarium system 10 is depicted in FIG. 1. The aquarium system depicted in FIG. 1 generally includes an aquarium tank 15, an inlet 25, an outlet 35 and a water treatment unit 45. The aquarium tank 15 defines a container for water 16 that is in fluid communication with the inlet 25. Any suitable inlets and outlets are contemplated. In one embodiment, the inlet 25 includes an inflow box or inlet reservoir 26, a first water line 27 or inlet conduit and a check valve 28. The water line 27 is attached to the inflow box 26 and the treatment unit 45 with appropriate fixtures 30. The first check flow valve 28 does not allow water to flow towards the treatment unit.

A wave wall 32 is configured so that water displaced from the inlet reservoir flows over into the aquarium tank 15 along a flow path F. In one embodiment, the inlet and outlet conduits 27, 37 are placed on opposite ends 18, 19 of the aquarium tank 15 to ensure that the flow goes from one end of the tank 15 to the other.

The aquarium tank 15 preferably includes coral sand 17 and live rock 20 which defines a forward reef 21, a back reef 22 and a crest 23 as shown in FIG. 1. Live rock is understood in the art to include any type of rock material that includes living organisms. Any suitable live rock is contemplated including but not limited to natural and cultured reef and synthetic materials. Preferably, the live rock will be composed of old coral skeletons and shells encrusted with plants such as coralline algae. The live rock will preferably also include a variety of living organisms such as worms, crustaceans, clams, sponges, algae, nitrifying and denitrifying bacteria and heterotrophic bacteria.

Outlet 35 preferably includes an outlet reservoir 36, a second water line 37 or outlet conduit and an overflow wall 42. The overflow wall 42 is preferably positionable between the outlet container 36 and the aquarium tank 15. The overflow wall 42 is configured so that water displaced from the aquarium tank 15 flows over into the outlet reservoir 36. The second water line 37 is in fluid communication with the treatment unit 45 and the outlet reservoir 36. in one embodiment, the outlet conduit 37 includes a second check valve 38 which is configured to prevent fluid flow towards the outlet reservoir 36.

The treatment unit 45 defines a tank for holding water 46 and a fluid movement device. In one embodiment, the fluid movement device includes a media wheel 47 rotatably supported in the treatment unit 45. The treatment unit preferably includes a plexiglass tank 46. The media wheel 47 includes a first hollow portion 48 and a second portion 49 carrying a water displacement media 50. The media wheel 47 is rotatably supported by any appropriate means. For example, the media wheel 47 can be suspended by an axle 51 threaded through a bore 52 drilled into the center of the media wheel 47. The media 50 is alternately submersible into and raisable out of water or fluid 55 contained in the water treatment unit 45 as the media wheel 47 is rotated to displace water from the unit 45 to the inlet reservoir 25 to thereby cycle water through the system 10.

The invention also contemplates means for rotating the media wheel 47. Preferably, the means for rotating the media wheel 47 includes an air pump 60 which delivers air 61 to the treatment unit 45 through an air tube 62, which is introduced into the treatment tank 46 through an air tube aperture 63 defined in the tank 46. Preferably, the system includes an air flow control valve 67 which most preferably includes a timer for automatic flow variation. Timers of this sort are well known in the art and can be easily installed on the control valve 67 of the air pump 60.

Figure 2:
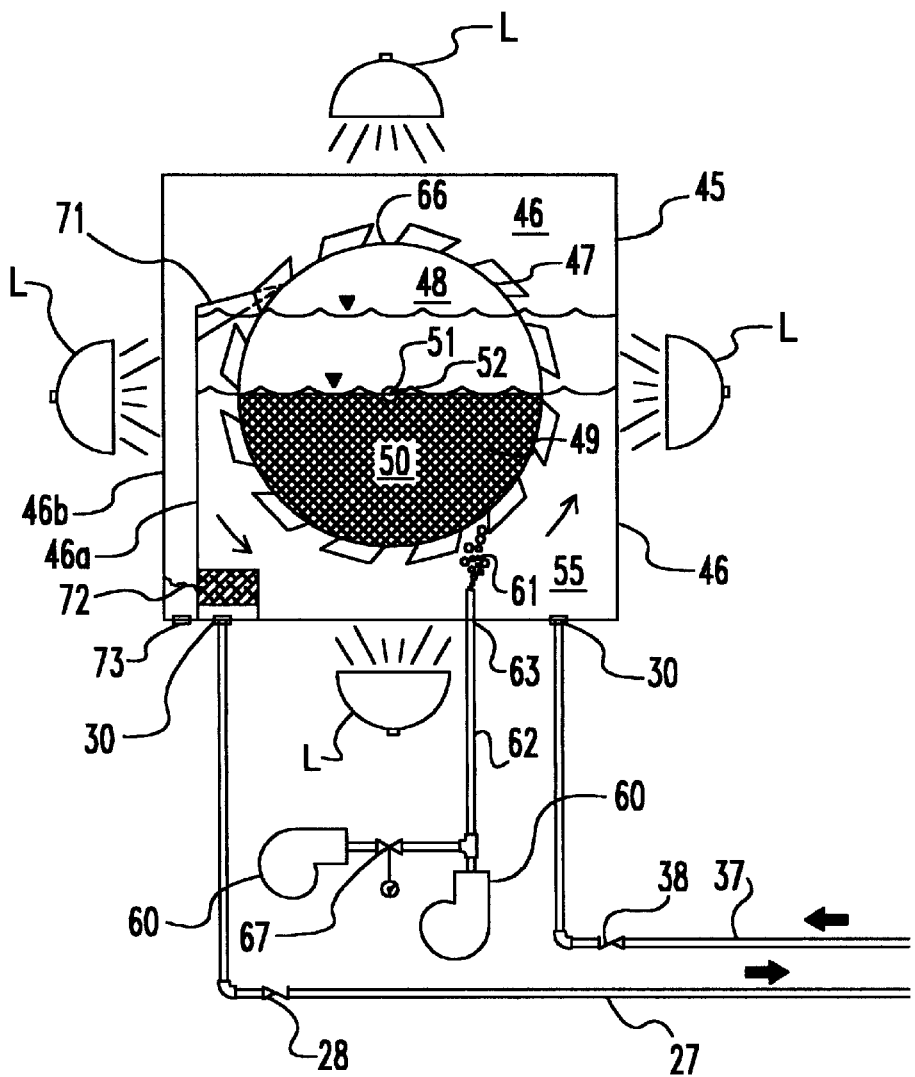
FIG. 2 is a side elevational view of one embodiment of a treatment unit according to this invention.
Figure 3:
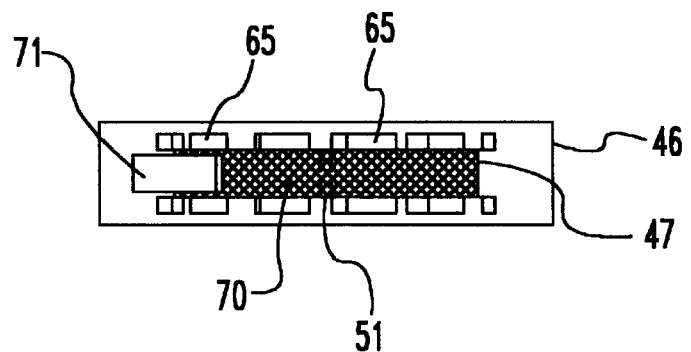
FIG. 3 is a top elevational view of the treatment unit depicted in FIG. 2.

As shown in FIGS. 2 and 3, one preferred embodiment of this invention includes a plurality of air capture members 65 operatively associated with the media wheel 47. The air capture members 65 are configured to capture air 61 from the air pump 60 to rotate the media wheel 47 and move water through the system as the media 50 is alternately submerged into and raised out of the water. In one embodiment, the air capture members 65 are attached to an outer perimeter 66 of the media wheel 47.

Now referring to FIGS. 1–3, the operation of a system according to this invention will be described. Air 61 is introduced into the air capture members 65 which can be plastic cup-like members attached to the perimeter 66 of the media wheel 47. Capture of air 61 by air capture members 65 causes the air capture members 65 to rise which in turn causes the media wheel 47 to rotate either clockwise or counterclockwise depending on the configuration of the air capture members 65 and the air tube 62. The rotation of the media wheel 47 alternately moves the displacement media 50 into and out of the fluid.

When the displacement media 50 is forced into the fluid 55, the fluid level in the treatment unit will rise to level A due to the fluid displaced by the volume of the displacement media 50. This will in turn cause fluid to flow from the treatment unit 45 to the aquarium 15. The fluid displaced from the treatment unit 45 will flow into the inlet conduit 27 and into the inlet container 26. The first check valve 28 prevents fluid flow from the inlet container 26 and the inlet conduit 27 back into the treatment tank 46. Fluid from the inlet container 26 will overflow the wave wall 32 as the fluid reaches the level A'. When the displacement media 50 is forced out of the fluid, the fluid level in the treatment unit will drop to level B' and the higher level A' in the aquarium will cause fluid to flow back to the treatment unit 45. Fluid in the aquarium tank 15 overflows the overflow wall 42 into the outlet container 36 through the outlet conduit 37 and into the treatment tank 46 to complete a surge cycle. The second check valve 38 prevents flow back into the outlet container 36. The continued displacement of fluid by submersing and raising the displacement media 50 causes a continuous movement of fluid through the system during these surge cycles.

Preferably, the displacement media 50 includes a biological filter media for supporting bacterial growth. The biological filter media may be any media which is suitable for supporting bacterial growth, including solid, semi-solid and liquid media. Most preferred is plastic bacterial media. Any suitable plastic material which will support aerobic bacterial growth is contemplated, such as polyethylene. Aerobic bacteria contribute to the health of a natural-type captive ecosystem by removing ammonia and particulate waste. This invention provides advantages over other rotating biological filters in that a water pump is not required and the bacterial filter media also moves water through the system. The movement of the filter media in and out of the water combined with the air from the air pumps will provide a good gas transfer between the bacterial attached to the media and the water.

The media wheels 47 of the present invention also preferably include an algae screen 70 attached to at least a portion of the media wheel 47 for supporting algal growth. The use of algae in aquarium systems is beneficial for controlling oxygen concentration, pH and nutrient availability. One or more lights, preferably metal halide lights L may be provided to illuminate the media wheel 47 to encourage algal growth.

Preferably the system also includes an algae scraper 71 which is used to harvest the algae. In the embodiment shown in FIG. 2, the algae scraper 71 is attached to a scraper support wall 46a. Algae scraper 71 is preferably aligned to contact a portion of the algae screen 70 to continuously scrape algae from the screen as the media wheel 47 is rotated. A harvested algae zone 72 is also preferably provided. In the embodiment shown in FIG. 2, the harvested algae zone 72 is defined by the scraper support wall 46A and an outer wall 46B of the treatment tank 46.

One advantage of the present invention is that it harvests algae automatically and continuously, which avoids the need for manual scraping. The present invention also provides a further advantage because the algae screen 70 is attached to the perimeter 66 of the media wheel 47 which is rotated into and out of the water. The movement of the screen 70 in and out of the water when combined with the high intensity metal halide lights L makes the perimeter 66 of the media wheel 47 a natural environment for the growth of algae. The constant submergence and removal of the algae from the water provides for good gas exchange between the algae, water and air and provides the varying intensity of light on the algae. This action resembles a natural system where ocean tides rise and fall over algae covered rocks. Furthermore, the algae and bacteria are in close proximity to one another allowing for more efficient and quicker gas exchange between the two. This is in contrast to most aquarium water systems which do not include both algae and bacterial treatments and which separate biological treatment from other forms of treatment.

Figure 4:
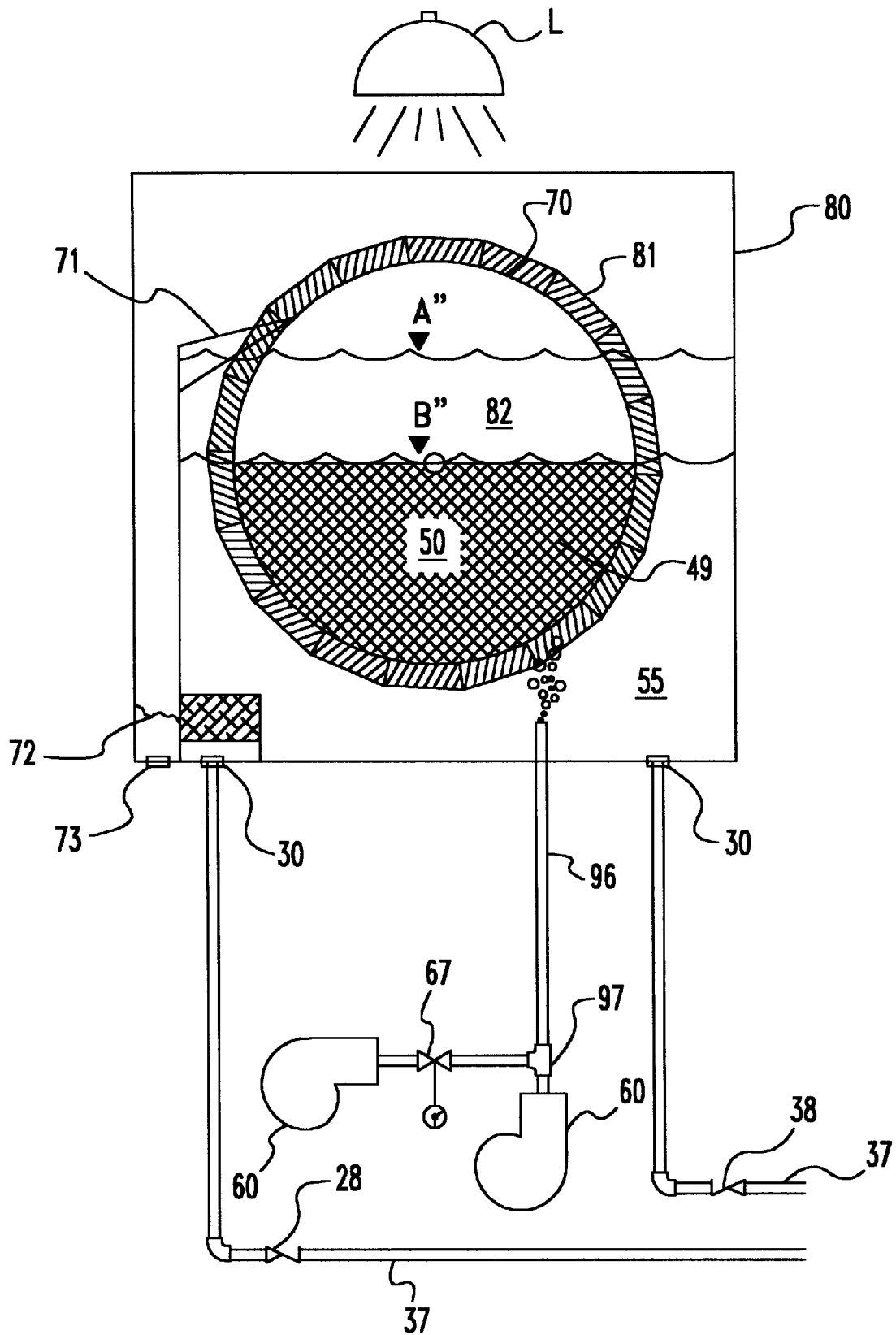
FIG. 4 is a side elevational view of another embodiment of a treatment unit according to this invention.
Figure 5:
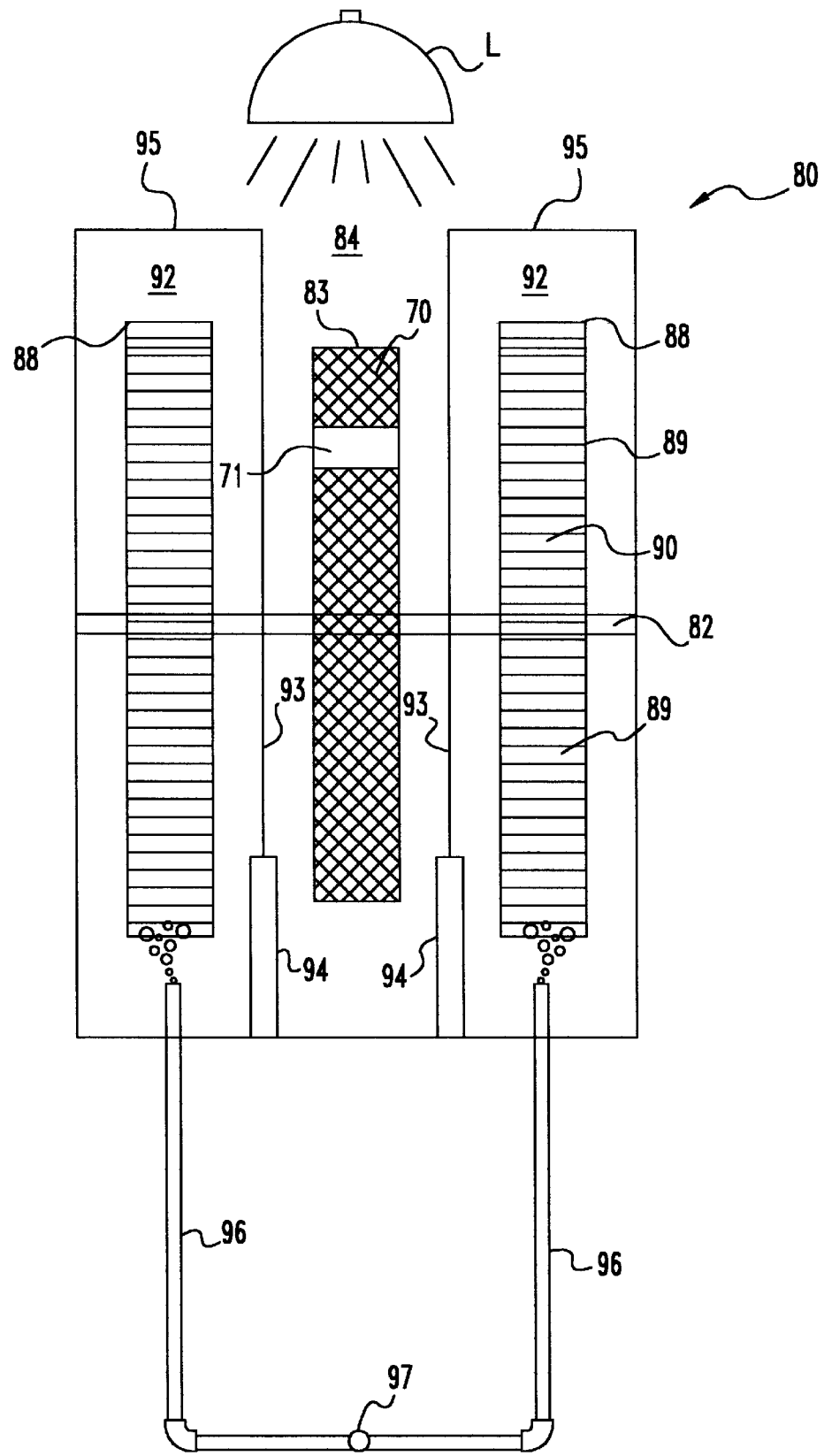
FIG. 5 is a front elevational view of the treatment unit depicted in FIG. 4.
Figure 6:
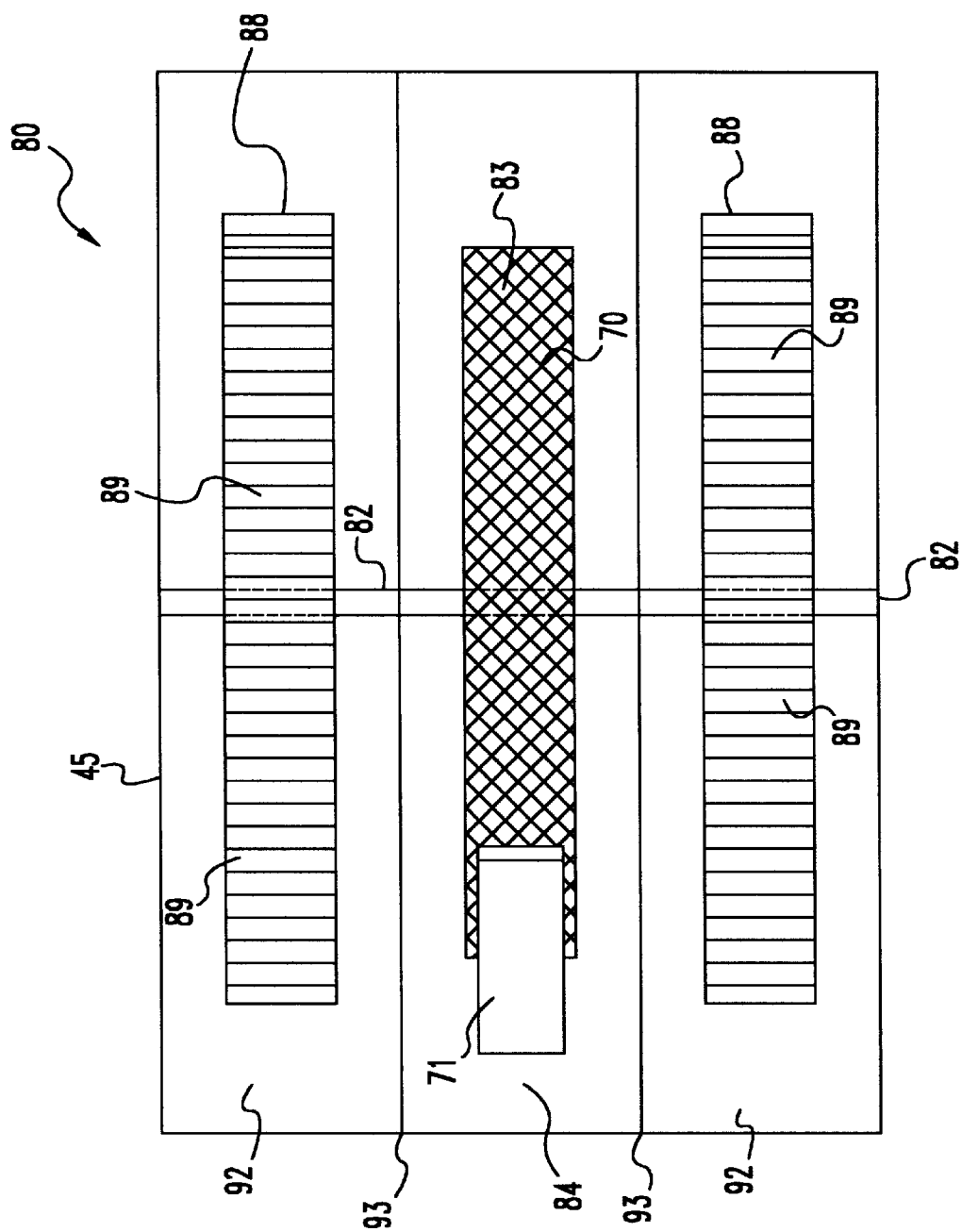
FIG. 6 is a top elevational view of the treatment unit of the treatment unit depicted in FIGS. 4 and 5.

In one preferred embodiment as depicted in FIGS. 4–6, the treatment unit 80 includes two or more separate wheels 81 joined by a common axle 82. The wheels 81 are preferably rigidly attached to the axle 82 so that they all turn in unison. The efficiency of the systems and devices of this invention to move water is dependent on the ratio of the volume of displacement media 50 to a volume of water 55 in the system. The greater amount of media 50, the greater amount of water displaced, i.e., the higher the water will rise in the tanks. Adding wheels 71 to the system increases the amount of the displacement media 50 without increasing the size of the tank or the quantity of water. Thus, the water will rise higher in the tanks when the media 50 is submerged and will pump more water through the system. Preferably, one of the wheels is a biological wheel supporting bacterial and preferably also algal growth, while the remaining wheels are air capture wheels 88. As shown more clearly in FIGS. 5–6, the biological wheel 83 includes an algae screen 70 which supports the growth of algae as well as biological filter media. The algae scraper 71 harvests algae from the screen 70 into the harvested algae zone 72 as described above. The larger amount of media in this embodiment adds more surface area for bacterial growth.

One or more of the wheels 81 are preferably air capture wheels 88 as shown more clearly in FIGS. 5 and 6. Preferably, each of the air capture wheels 88 reside within an air capture zone 92 and the biological wheels 83 reside within a biological zone 84 as shown in FIGS. 5 and 6. The air capture zone 92 may be defined by divider walls 93, which preferably are supported by divider wall supports 94. The air capture zones can also be defined by light opaque covers 95. One advantage of this embodiment is that the air capture wheels 88 are not exposed to light. This prevents algal growth on the air capture wheels 88 and air capture members 89 which can reduce the amount of air that the air capture members 89 will capture and may possibly cause the treatment unit to clog up and stop. Therefore, this embodiment reduces the amount of maintenance required on the system. Embodiments which include more than one air capture wheel 88 will preferably include air tubes 96 for each air capture wheel 88 and air capture zone 92. In the embodiments shown in FIGS. 4 and 5, the air tubes 96 meet at a common joint 97.

Figure 7:
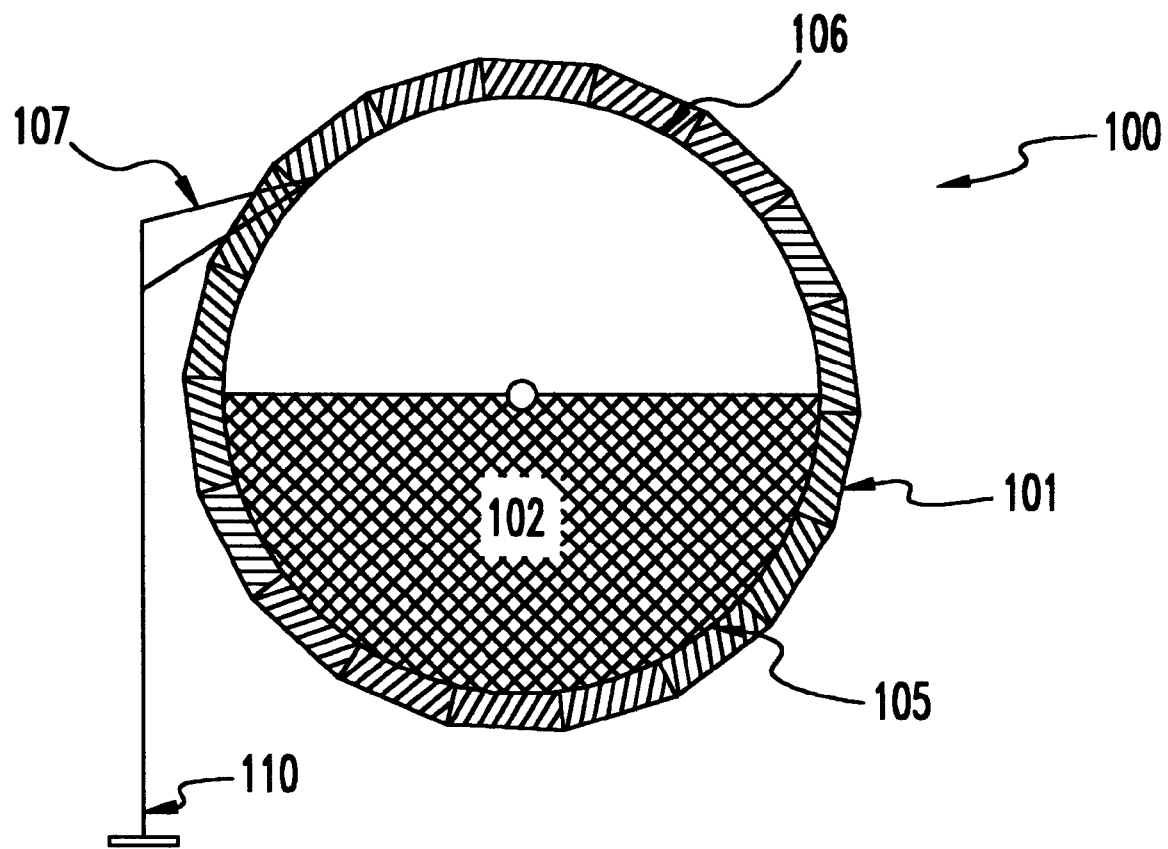
FIG. 7 is a side elevational view of a fluid treatment device according to this invention.

This invention also contemplates biological fluid treatment devices. One such device 100 is depicted in FIG. 7 and includes a rotatably supported wheel 101 carrying a biological filtration media 102 for supporting bacterial growth. The wheel 101 is at least partially filled with media 102. Media 102 is alternately submersible into and raisable out of fluid when the wheel 101 is rotated in the fluid 103. An algae screen 105 is attached to at least a portion of the wheel 101 for supporting algae growth. Preferably, the screen 105 is attached to the perimeter 106 of the wheel 101. Most preferably, the device includes an algae scraper 107 aligned to contact a portion of the screen 105 to continuously scrape algae from the screen 105 as the wheel 101 is rotated. As shown in FIG. 7, the scraper 107 is preferably supported by a support member 110.

Figure 8:
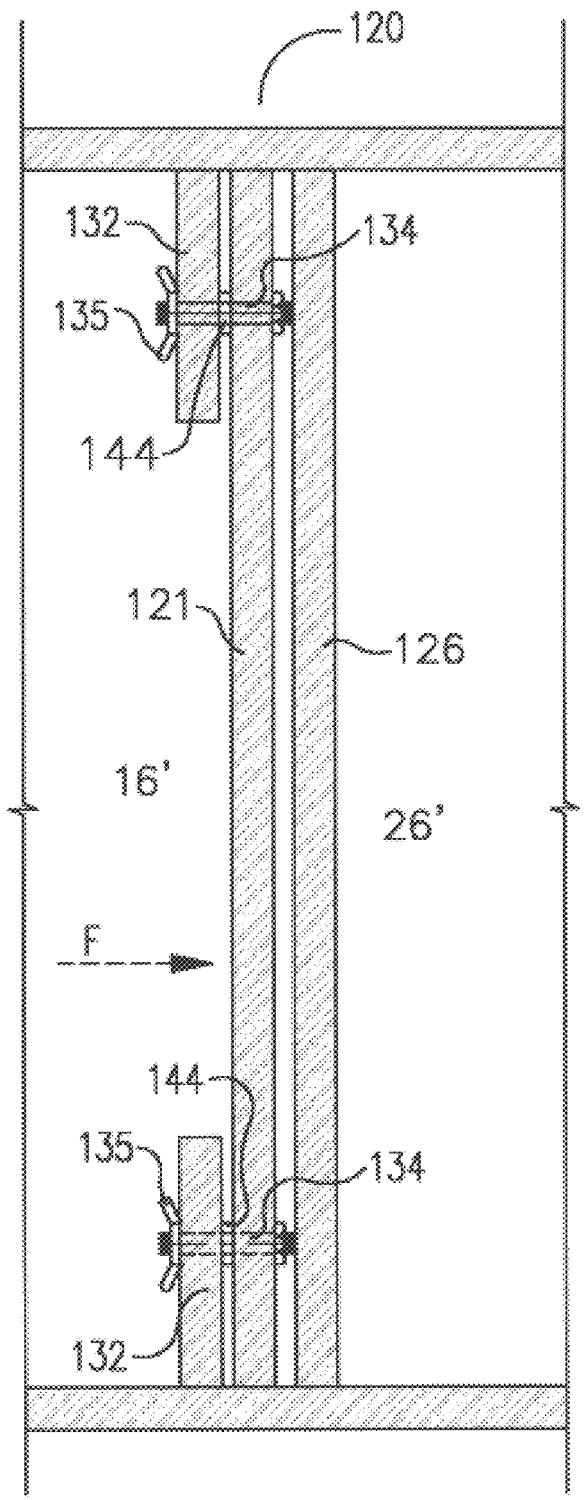
FIG. 8 is a partial top view of a weir assembly according to this invention.
Figure 9:
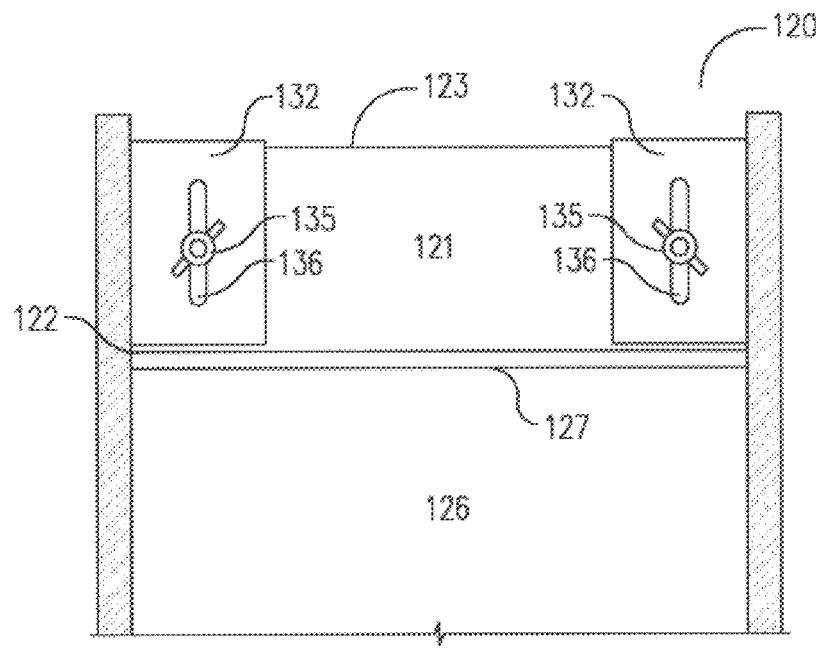
FIG. 9 is a front elevational view of the weir assembly depicted in FIG. 8.
Figure 10:
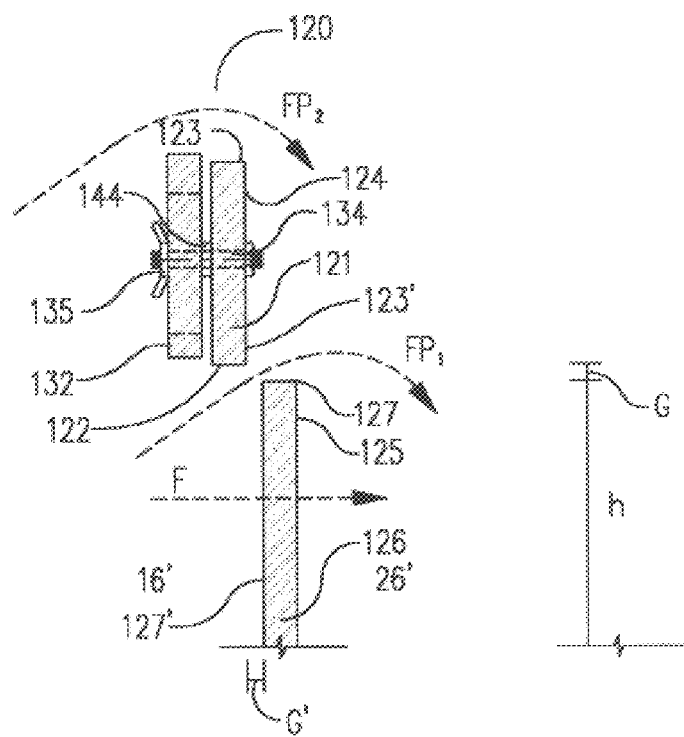
FIG. 10 is a side sectional view of the weir assembly depicted in FIG. 8.

In a preferred embodiment, wave wall 32 is replaced with a weir assembly 120 as shown in FIGS. 8–10. Weir assembly 120 is disposed between the inlet reservoir 16' and tank 26' and includes a pair of offset weirs, an upper weir 121 and a lower weir. Lower weir 126 is disposed in the flow path F. Lower weir 126 has a height h, a back 127' surface, and an upper crest 127 at a top portion 125 of the lower weir 126. Upper weir 121 is disposed above the lower weir 126 has a front 123' surface and has a lower edge 122 that is offset from the lower crest 127 to form a portion of a first fountain path $FP_1$ for the fluid. Upper weir 121 preferably includes an upper crest 123 disposed at a top portion 124. Upper crest 123 defines a portion of a second fountain path $FP_2$ for fluid.

Preferably, the lower surface 122 of upper weir 121 is vertically displaced above the lower crest 127 to form a vertical gap G between the upper and lower weir 121, 126. The dimensions of gap G will vary depending on desired flow path trajectory and flowrate across the weir. Preferably, the front surface 123' of upper weir 121 is horizontally offset from the back surface 127' of lower weir 126 to form a horizontal gap G' between the upper and lower weirs 121, 126. The dimensions of gap G' will vary depending on the desired flow path, trajectory and flowrate across the weir. During initial set up or maintenance of the system, the height of gap G and with a gap of $G^1$ can be adjusted. In the particular embodiment shown in FIGS. 8–10, upper weir 121 is engaged to a pair of supports 132 with fasteners 134 through slots 136 defined through the upper weir 121. Washer 144 is used to adjust gap G'. The height of gap G can be adjusted by loosening the wing nuts 135 and sliding the upper weir 121 to a desired position with the fastener 134 engaged within the slot 136.

Figure 11:
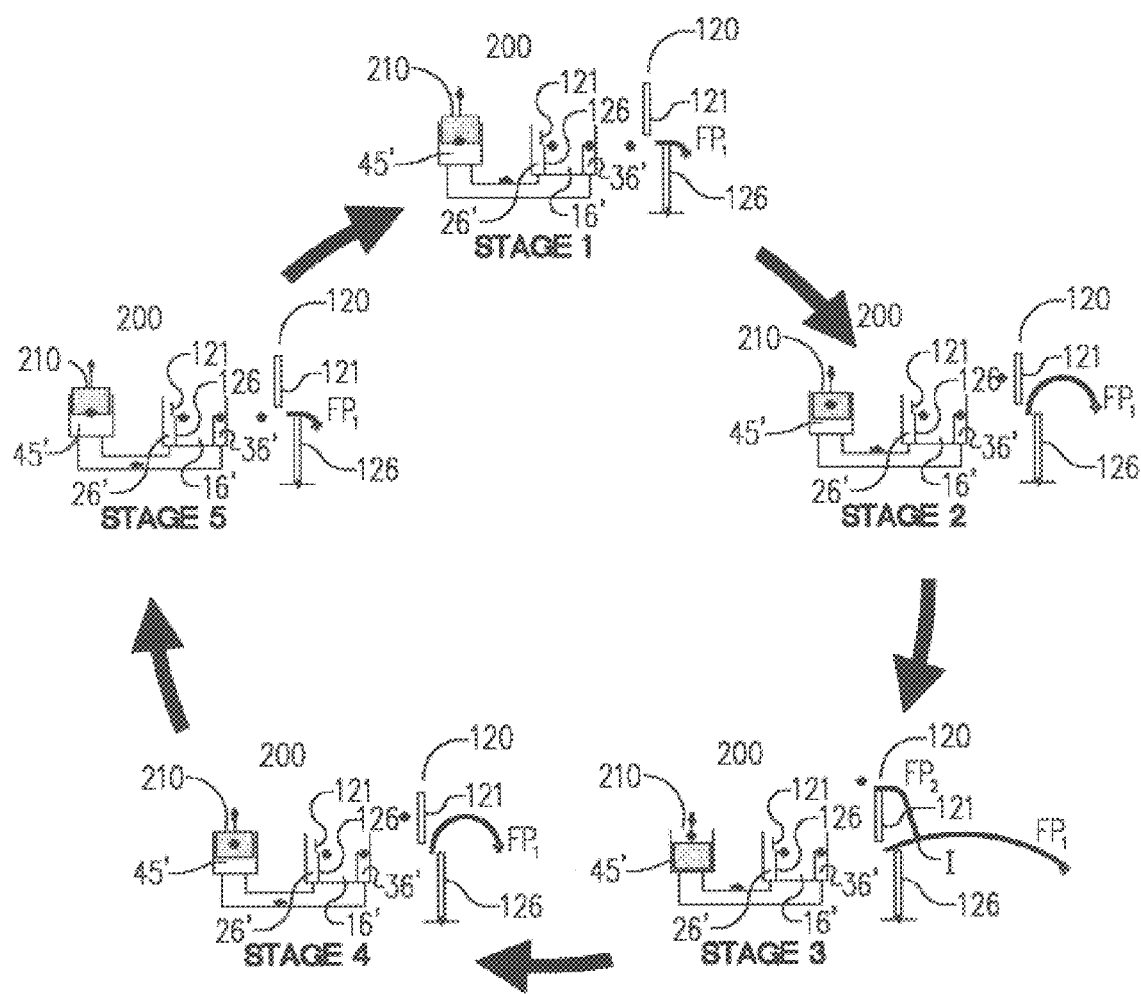
FIG. 11 is a diagram showing a surge cycle of one embodiment of the present invention.

The weir assembly 120 of this invention is best used with a fluid surge device, which may include the devices described herein, a water pump or any other suitable means that will periodically displace fluid through the weir assembly. The surge cycle of an aquarium system 200, which includes weir assembly 120 is diagrammed in FIG. 11. A pump 210 of some sort, such as a wheel device of this invention, is used to periodically displace fluid in treatment tank 45'. In Stage 1, as the surge device 210 submerges into fluid in the treatment tank 45' or otherwise empties fluid from the tank 45', fluid rises below the lower weir 126 causing fluid to flow over the lower weir 126 in the first fountain path $FP_1$. As the surge device 210 continues to submerge or empty the treatment unit 45' in Stage 2, the fluid level rises and causes the fluid to shoot upward over the lower weir 126 creating a fountain effect. The height of the fountain continues to increase as the fluid level behind the lower and upper weirs 126, 121 increase. As the surge device becomes completely submerged or empty, the fluid level behind the weir assembly 120 rises above and spills over the upper weir 121 in the second fountain path $FP_2$ as shown in Stage 3. The second fountain path $FP_2$ intersects the first fountain path $FP_1$ at point I. The collision of the fountains forces the first fountain path $FP_1$ downward and increases the velocity of the fluid and the distance d the fluid is forced into the aquarium or other body of fluid. In Stage 4, the surge devices raises from the fluid or allows the filling of the treatment unit and the fluid level behind the surge assembly 120 starts to fall, which stops the flow over the upper weir 121. This allow the first fountain to return to its upward projectory. Finally, in stage 5, the lower weir 126 limits the fluid flow until the next surge cycle begins. Preferably, the lower weir has a height h that is configured so that fluid continuously flows over the lower crest 127 during the entire surge cycle so that there is a continuous fluid flow through the system.

The weir assemblies of this invention provide a fountain and waterfall effect that is interesting, attractive and soothing to see and hear. The sound is very similar to waves of the ocean crashing on a beach. In preferred embodiments, the aquarium systems of the present invention include visual elements that complete natural ambiance.

Figure 12:
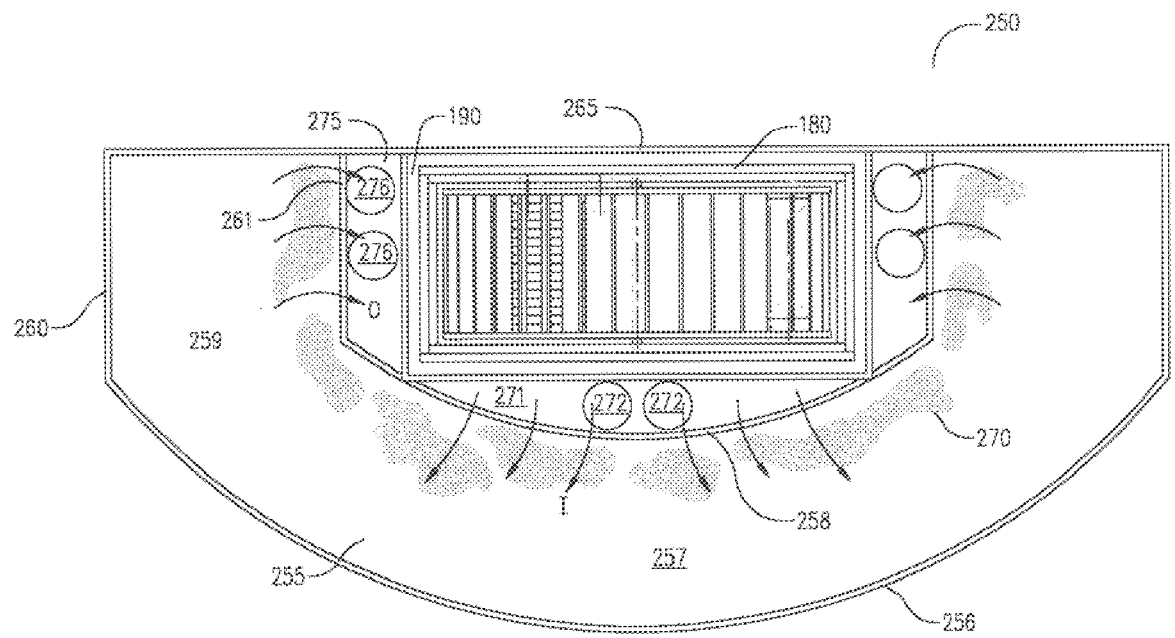
FIG. 12 is a top elevational view of an aquarium assembly according to this invention.
Figure 13:
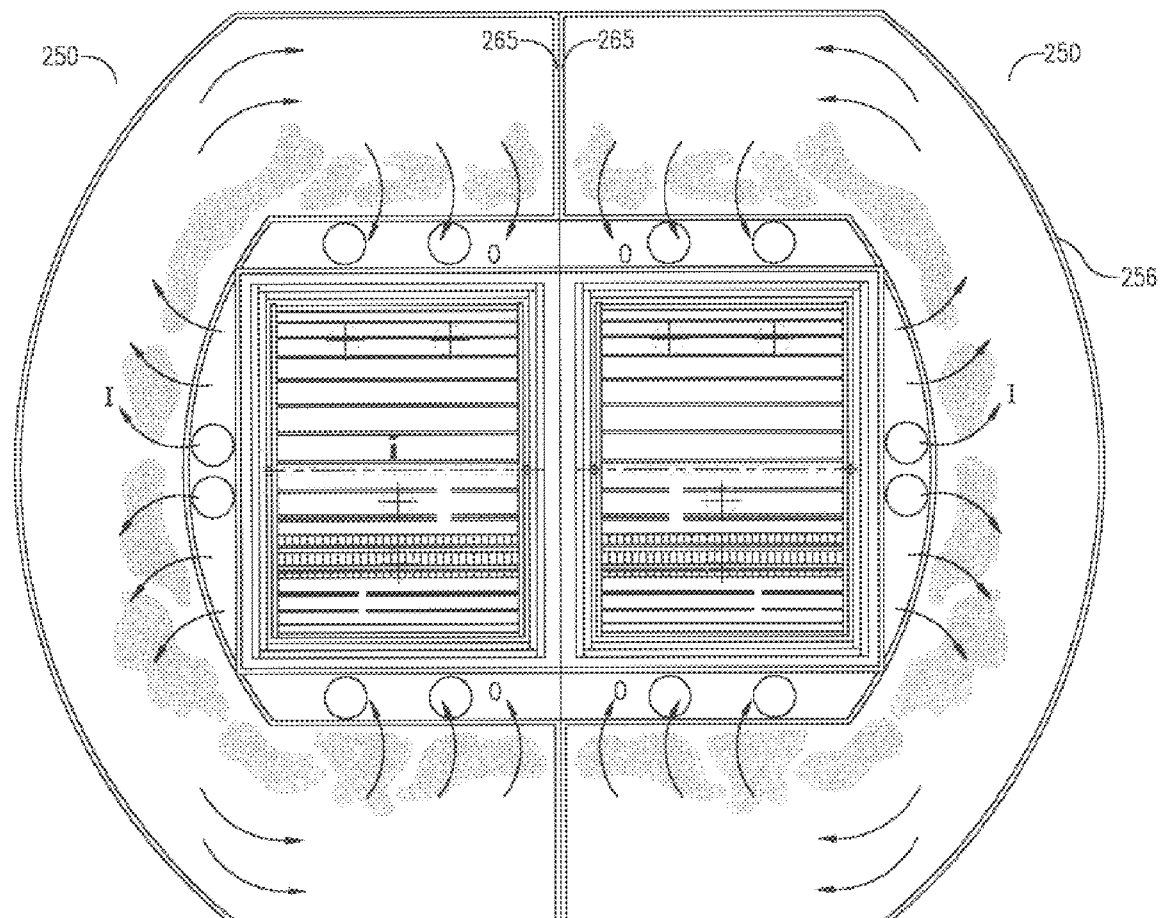
FIG. 13 is a top elevational view of another aquarium assembly according to this invention.
Figure 14:
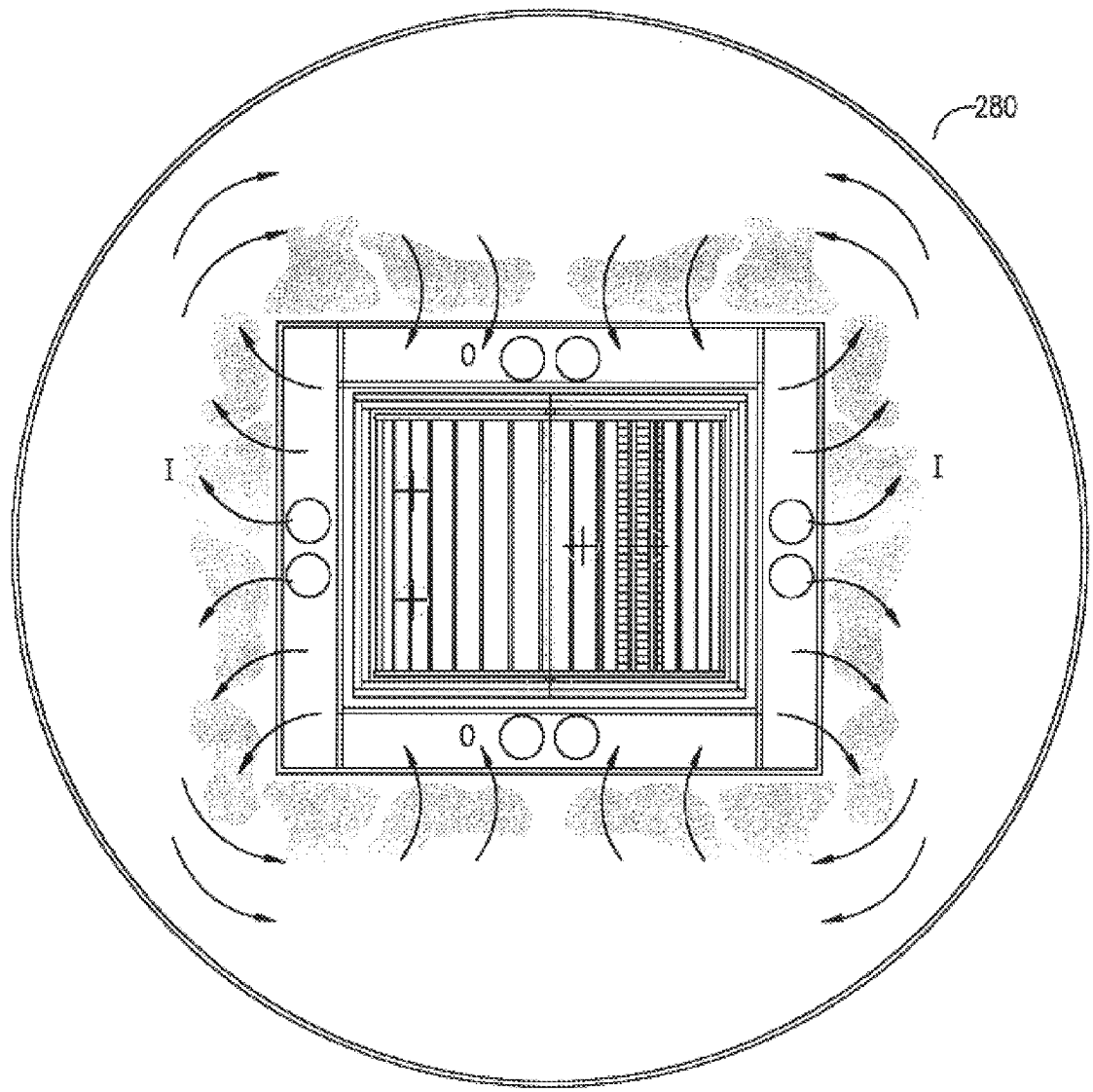
FIG. 14 is a top elevational view of another aquarium assembly according to this invention.

FIGS. 12–14 show systems that hide the treatment unit and create a more natural appearance. For example, aquarium tank 255 of system 250 shown in FIG. 12 includes a front portion 257 having a transparent front viewing wall 256 and an opposite back wall 258 adjacent the treatment unit 180. An opaque decorative member 270 is disposed within the tank 255 between the viewing wall 256 and the back wall 258. The decorative member 270 is configured and disposed adjacent the back wall 258 to block the back wall 258 and the treatment unit 180 from view through the viewing wall 256. In one embodiment, the decorative member 270 has the appearance of rocks. Preferably, the decorative member is live rock.

The system 250 shown in FIG. 12 also includes side portions 259 that are in fluid communication with the front portion 257. The viewing wall 256 extends to form a side viewing wall 260. A side outlet wall 261 is disposed opposite of the side viewing wall 260. The side portions 259 and the front portion 257 form a substantially U-shaped configuration that defines a chamber 190 for housing the treatment unit 180. The back wall 265 of the system can be placed against a wall so that the treatment unit is not visible.

As the treatment unit 180 displaces water from the unit 180, water travel into the inlet reservoir 271 via inlet conduits 272. When fluid reaches a sufficient level in the reservoir 271 it enters the front portion 257 of the aquarium tank 255 along arrow I and appears to crash over the decorative member 270. Water then travels to the side portions 259 where it exits the tank 255 along arrow O into an outlet reservoir 275, through the outlet conduits 276 to return to the treatment unit 180. Preferably, the system will also be outfitted with a weir assembly of this invention with the decorative member disposed just below the first and second fountain paths to create a realistic image of ocean waves crashing over rocks.

Figure 15:
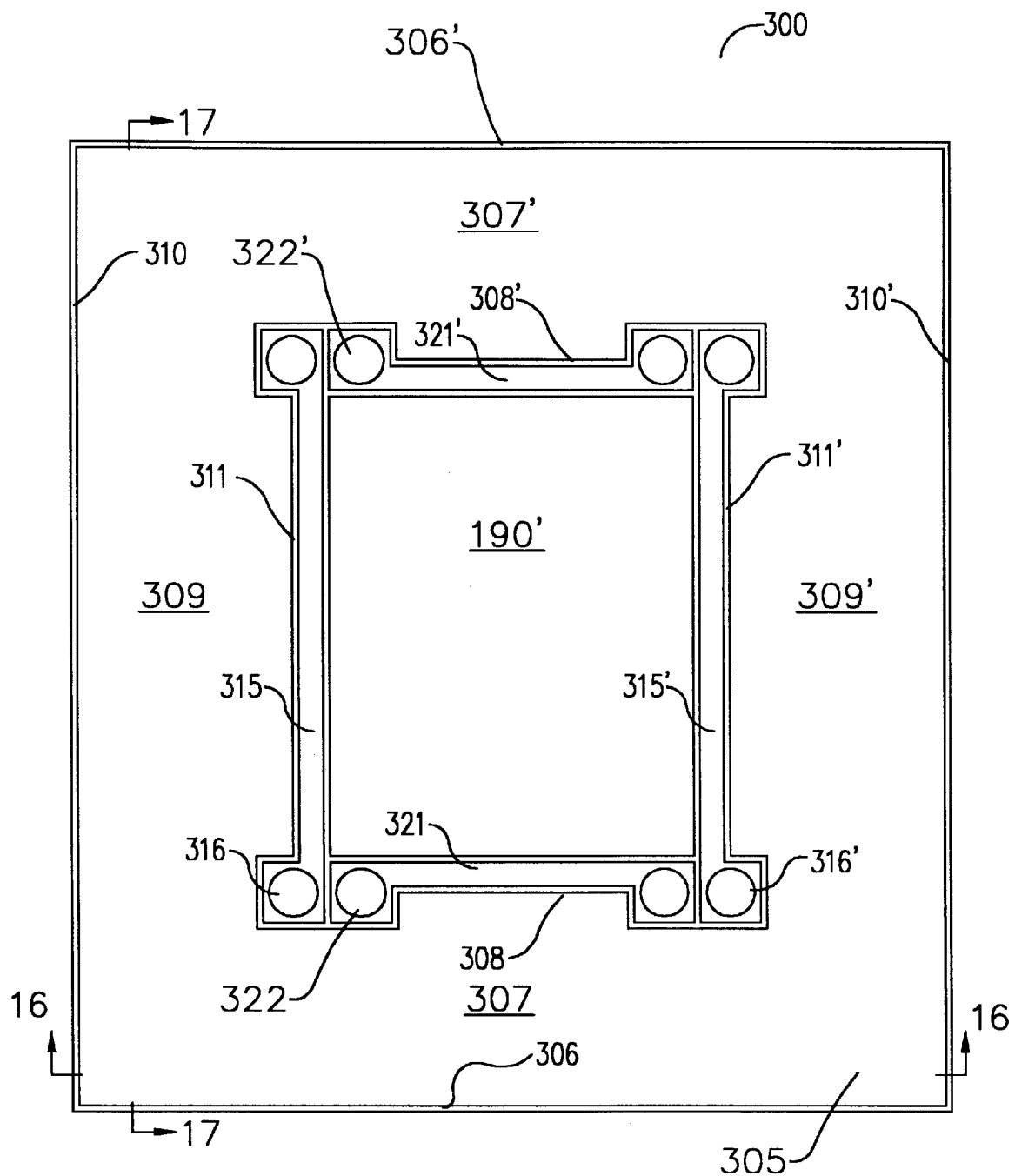
FIG. 15 is a top elevational view of another aquarium assembly according to this invention.
Figure 16:
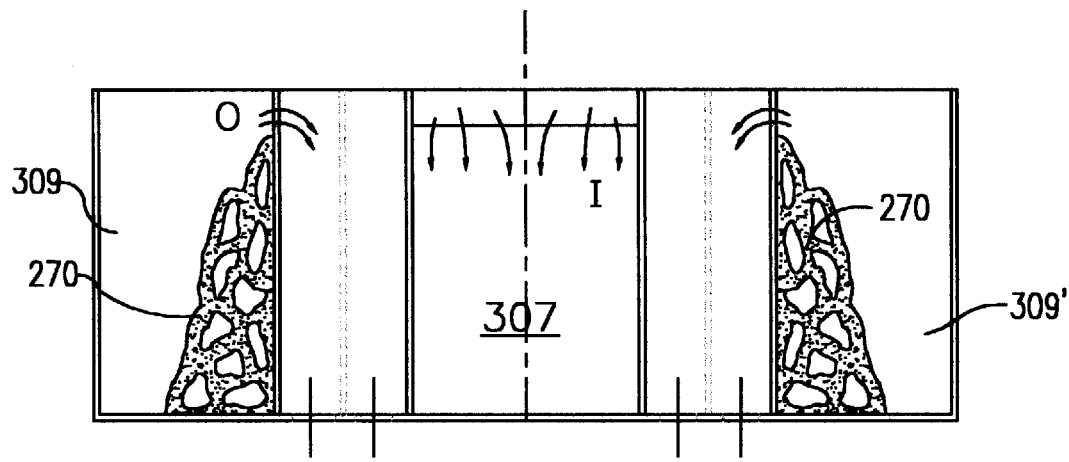
FIG. 16 is a side sectional view of the aquarium system depicted in FIG. 15 taken along lines 16—16.
Figure 17:
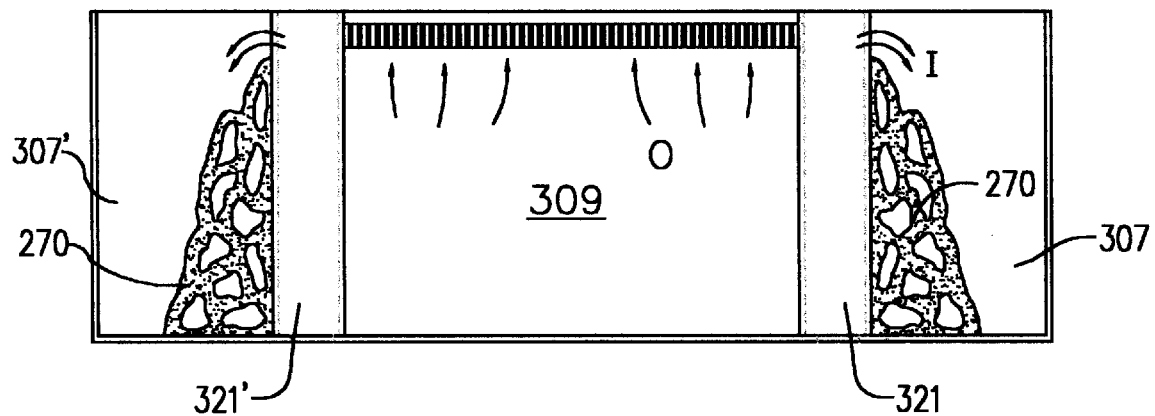
FIG. 17 is a side sectional view of the aquarium system depicted in FIG. 15 taken along lines 17—17.

When it is desirable to view an attractive image of the aquarium system from all sides, two of the systems 250 depicted in FIG. 12 can be placed back to back 265. It is also contemplated that the systems 250 shown in FIG. 13 could be combined into a single system 280 shown in FIG. 14. A similar system 300 is shown in FIGS. 15–17. Aquarium tank 305 a pair of opposite viewing portions 307, 307' each having a transparent front viewing wall 306, 306' and an opposite back wall 308, 308' adjacent a chamber 190' for holding a treatment unit 180. Tank 305 includes side portions 309, 309' are in fluid communication with the viewing portions 307, 307'. The side portions are each formed by a side viewing walls 310, 310' and a side outlet wall 311, 311' disposed opposite of the side viewing walls 310, 310'. The portions 307, 307', 309, 309' define a chamber 190' for the treatment unit 180. Preferably, an opaque decorative member 270 such as live rock, will be placed near the back walls 308, 308' to block the treatment unit 180 from view through the viewing walls 306, 306'.

The operation of the aquarium system 300 is similar to those described above. As the treatment unit 180 displaces water from the unit 180, water travel into the inlet reservoir 321, 321' via inlet conduits 322, 322'. When fluid reaches a sufficient level in the reservoirs 321, 321' it enters each of the front portions 307, 307' along arrow I and appears to crash over the decorative member 270. Water then travels to the side portions 309, 309' where it exits the tank 305 along arrow O into an outlet reservoir 315, 315' through the outlet conduits 316, 316' to return to the treatment unit 180. When system 300 is combined with the weirs of this invention, a natural appearing ocean-like look is achieved from all sides of the aquarium tank.

The present invention combines algae treatment, biological filtration, water movement, wave creation and air supply in a single unit that can be installed with existing aquarium devices with only a minimum of modification. The devices of this invention provide complete water treatment for fresh and salt water aquariums and other fluid systems using both algal and biological processes.

Devices according to this invention provide advantages over existing algae scrubbers which pump water across the algae surfaces in that these novel devices move the algae surface through the water. The prior art horizontal algae scrubbers would have to be over three times the length of that of the present invention to have the same surface area provided by this invention.

The present invention also provides advantages over existing rotating biological contactors used in waste water systems which are completely filled with media. These rotating biological contactors require water to enter openings on the outside surface area for water movement across the media. Even though the contactors are open on their ends and submerged in water, the media is so tightly packed that water can only move radially through them and horizontally. Therefore, they cannot have air capture members covering the entire perimeter of the wheel. Since the present invention includes media wheels that are only partially filled with media, water is moved across the media as it is moved in and out of the water. Thus, the entire perimeter of the air capture wheels can be used for air capture members giving the device a greater rotating capacity.

The present invention also provides significant advantages over systems that require centrifugal water pumps because such pumps kill plankton populations which are necessary for filter feeding organisms. The present invention does not require water pumps so plankton populations can flourish creating a more natural environment. Prior art systems that require a pump and bucket device to move water across a stationary algae surface create a wave motion which causes splashing and salt build-up. The present invention however creates more laminar waves which prevents splashing and salt build-up. Moreover, prior art systems only provide narrow "one directional" flow trajectories through the aquarium creating "dead zones". The present invention however, creates a current across the entire "face" or cross sectional area of the aquarium thus eliminating "dead zones". The present invention also aerates the water as it enters the aquarium.

The present invention further provides fluid treatment devices that provide the advantage that algae and bacteria are in close proximity to one another. This allows for more efficient and quicker gas exchange.

The combination of all of these features, along with the natural looking and acting wave action of the weir systems and the appearance and sound of the enclosed treatment unit chambers, finally achieves an ideal aquarium system. The treatment units and weir systems of this invention may also be used in other applications, such as aerating the effluent in wastewater treatment plants.

While the invention has been illustrated and described in detail in the drawings and foregoing description, the same is to be considered as illustrative and restrictive in character, it being understood that only the preferred embodiments have been shown and described and that all changes and modifications that come within the spirit of the invention are desired to be protected. For example, the present invention contemplates that the inlet and outlet reservoirs may be of any suitable configuration to deliver displaced water. Similarly, the treatment unit could be placed within an aquarium tank.

What is claimed is:

1. An aquarium system, comprising:
    a fluid inlet;
    an aquarium tank in fluid communication with said inlet to receive fluid displaced from said inlet, the fluid displaced in a flow path;
    a fluid outlet in fluid communication with said tank for receiving water displaced from said tank;
    a fluid treatment in fluid communication with said inlet and said outlet; and
    a weir assembly disposed between said inlet and said tank, said weir assembly including
        a lower weir disposed in the flow path, said lower weir having a first height and a lower crest at a top portion, and
        an upper weir disposed above said lower weir, said upper weir having a lower edge, said lower edge offset from said crest to form a portion of a first fountain path for the fluid.

2. The system of claim 1, further comprising an upper crest disposed at a top portion of said upper weir, said upper crest defining a portion of a second fountain path for the fluid.

3. The system of claim 2, wherein said lower surface of said upper weir is displaced above said lower crest to form a vertical gap between said upper weir and said lower weir.

4. The system of claim 2, further comprising a pump disposed in said treatment unit operable to displace fluid between said treatment unit and said tank.

5. The system of claim 4, wherein said pump includes a fluid surge device that periodically:
    displaces fluid from a higher level to a lower level in said treatment unit through said inlet and across said weir assembly to raise the level of fluid in the aquarium tank; and
    then returns fluid from said aquarium tank through said outlet to the higher level of fluid in said tank to complete a single surge cycle.

6. The system of claim 5, wherein said fluid surge device includes:
    a wheel having an axis and a perimeter and rotatably supported in said treatment tank, said wheel divided into two continuous portions, each of said portions extending from said axis to said perimeter, a first of said portions being hollow to receive fluid when said first portion is rotated into fluid; and
    a fluid displacement media disposed within a second of said portions and displacing fluid in said treatment unit when said second portion is rotated into fluid.

7. The system of claim 6, further comprising an air capture member disposed on said perimeter of said wheel.

8. The system of claim 5, wherein said first height of said lower weir is configured so that fluid continuously flows over said lower crest during the entire surge cycle.

9. The system of claim 8, wherein said upper weir has a height and position so that fluid flows over said upper crest as fluid is displaced from said treatment unit.

10. The system of claim 9 wherein the second fountain path intersects the first fountain path.

11. The system of claim 1, wherein said aquarium tank includes a transparent viewing wall and an opposite back wall adjacent said treatment unit.

12. The system of claim 11, further comprising:
    an opaque decorative member disposed within said tank between said viewing wall and said back wall.

13. The system of claim 12, wherein said decorative member has the appearance of rocks and is configured and disposed adjacent said back wall to block said back wall and said treatment unit from view through said viewing wall.

14. The system of claim 13, wherein a top portion of said decorative member is disposed below said first and second fountain paths to create the image that waves are crashing over rocks.

15. A fluid surge assembly, comprising:
    a treatment unit for receiving fluid, treating the fluid and depositing the fluid along a flow path to a body of fluid; and
    a weir assembly disposed in said flow path between said treatment unit and the body of fluid, said weir assembly including
        a lower weir having a first height and a lower crest at a top portion of said lower weir, said lower weir blocking a portion of said flow path, and
        an upper weir having an upper crest and a lower edge, said lower edge vertically and horizontally offset from said lower crest,
        wherein said lower edge of said upper weir and said lower crest define a first fountain path and said upper crest defines a portion of a second fountain path.

16. An aquarium system, comprising:
    an inlet conduit emptying into an inlet reservoir;
    an aquarium tank adjacent said inlet reservoir and in fluid communication with said inlet reservoir to receive fluid displaced from said inlet conduit, the fluid displaced in a flow path, said aquarium tank defining a front portion having a transparent front viewing wall and an opposite back wall adjacent said inlet reservoir, said aquarium further having a side portion in fluid communication with said front portion, said side portion having a transparent side viewing wall and an opposite outlet wall;

an outlet reservoir adjacent said outlet wall and in fluid communication with said tank for receiving water displaced from said tank, said outlet reservoir in fluid communication with an outlet conduit;

a fluid treatment unit in fluid communication with said inlet conduit and said outlet conduit; and a weir assembly disposed between said inlet conduit and said tank, said weir assembly including
- a lower weir disposed in the flow path, said lower weir having a first height and a lower crest at a top portion, and
- an upper weir disposed above said lower weir, said upper weir having a lower edge, said lower edge vertically offset from said lower crest to form a portion of a first fountain path for the fluid.

17. The system of claim 16, further comprising an opaque decorative member disposed within said tank to block said back wall and said treatment unit from view through said front viewing wall.

18. The system of claim 16, further comprising an opaque decorative member disposed within said tank to block said outlet wall and said treatment unit from view through said side viewing wall.

19. The system of claim 18 wherein said decorative member is live rock.

20. The system of claim 16, further comprising:
- a second side portion of said aquarium tank in fluid communication with said front portion, said second side portion having a second transparent side viewing wall and a second outlet wall, said aquarium tank having a substantially U-shaped configuration defining a chamber; and
- a second outlet reservoir adjacent said second outlet wall and in fluid communication with said tank for receiving water displaced from said tank, said outlet reservoir in fluid communication with a second outlet conduit;

wherein said treatment unit is disposed within said chamber in fluid communication with said second outlet conduit.

* * * * *

UNITED STATES PATENT AND TRADEMARK OFFICE
CERTIFICATE OF CORRECTION

PATENT NO.    : 6,158,386
DATED         : December 12, 2000
INVENTOR(S)   : Christopher A. Limcaco Page 1 of 1

It is certified that error appears in the above-identified patent and that said Letters Patent is hereby corrected as shown below:

Column 7,
Line 48, replace "71" with -- 81 --

Column 9,
Line 24, replace "allow" with -- allows --

Signed and Sealed this

Twenty-third Day of October, 2001

Attest:

NICHOLAS P. GODICI
Attesting Officer    Acting Director of the United States Patent and Trademark Office